United States Patent [19]

Kirk

[11] 4,052,179
[45] Oct. 4, 1977

[54] PORTABLE, POCKET SIZE ASH TRAY

[76] Inventor: Norbert A. Kirk, 2970 Sheridan Rd., Chicago, Ill. 60657

[21] Appl. No.: 713,506

[22] Filed: Aug. 11, 1976

[51] Int. Cl.² .......................................... B01D 50/00
[52] U.S. Cl. .................................. 55/385 G; 55/472; 131/233; 131/235 R; 131/242
[58] Field of Search ..................... 55/385 G, 471, 472; 131/231, 233, 235 R, 237, 238, 242

[56] References Cited

U.S. PATENT DOCUMENTS

| 924,569 | 6/1909 | Moses | 131/233 |
| 2,611,679 | 9/1952 | Haulenbeek et al. | 55/279 |
| 2,788,085 | 4/1957 | Waller | 131/231 |
| 3,606,998 | 9/1971 | Porte et al. | 55/472 |
| 3,797,205 | 3/1974 | Weisskopf | 55/385 |
| 3,921,646 | 11/1975 | Kosta | 55/385 G |
| 3,958,965 | 5/1976 | Raczkowski | 55/385 G |

Primary Examiner—Bernard Nozick
Attorney, Agent, or Firm—Larson, Taylor and Hinds

[57] ABSTRACT

A portable air purifying ash tray is depicted which in one embodiment comprises a housing having first and second internal compartments and first and second covers respectively for selectively covering said first and second compartments. The first internal compartment is for receiving the ashes from a smoker item such as a cigarette and can include a snuffer mounted therein for extinguishing the smoking item. A fan and battery power supply is mounted in the second compartment for exhausting the smoke from the first compartment through a filter mounted between the compartments. Opening of the first cover operates a control circuit which in turn energizes the fan.

6 Claims, 8 Drawing Figures

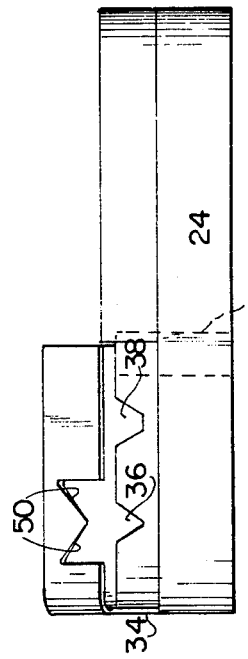
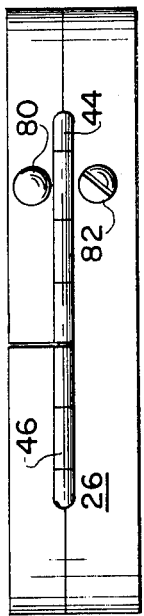
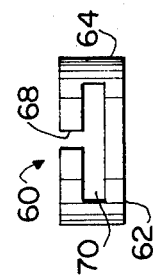
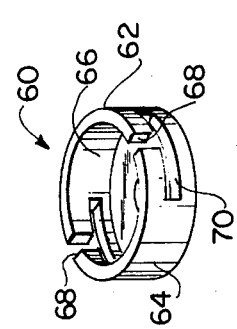
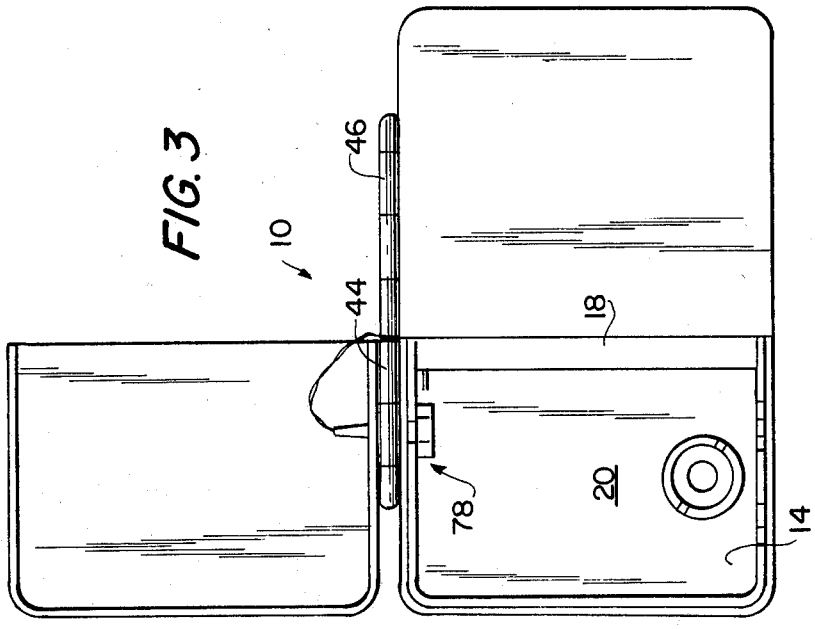
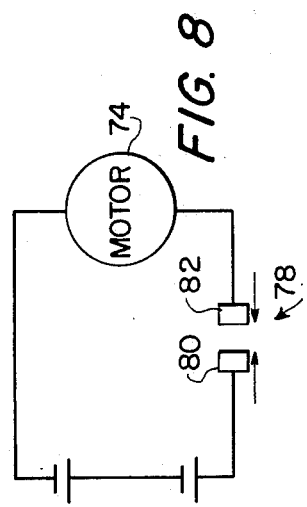

PORTABLE, POCKET SIZE ASH TRAY

BACKGROUND OF THE INVENTION

1. Field of the Invention

The present invention relates in general to ash trays and relates more particularly to a portable ash tray having an air purifying and deodorizing device for removing objectionable particulate matter and odor causing gases in the smoke rising from a lighted cigarette placed in the ash tray.

2. Description of the Prior Art

With the recent large amount of publicity regarding the dangers from cigarette smoke, both to the smoker and to the non-smoker subjected to smoke in public places, the rights of the non-smoker is receiving increased attention. Bans are being proposed on smoking in enclosed public facilities such as public buildings, on public transportation and in passenger stations therefor, and in commercial establishments where the public congregates such as in restaurants and the like. It has been observed that a large percentage of tobacco smoke comes from smoker items such as cigarettes and cigars that have been left burning in an ash tray. Tobacco smoke is generally offensive and perhaps unhealthy to the non-smoker subjected to it and therefore it is desirable to eliminate as much tobacco smoke as possible.

Several prior art devices have addressed the problem of disposing of tobacco smoke from ash trays. For example, both the U.S. Pat. No. 3,516,232, to Gilbertson, and to Fike et al, U.S. Pat. No. 3,807,148, disclose ash tray devices which comprise in addition to the ash tray a fan and a filter means. However, none of the known prior art devices are compact and portable so that the ash tray device can be carried for example in the smoker's pocket, while at the same time still can be used to effectively and efficiently purify and deodorize the tobacco smoke. Other similar devices are disclosed in U.S. Pat. Nos. 2,730,107; 3,860,404; 2,029,192; and 3,797,205.

SUMMARY OF THE INVENTION

Thus there is a need for an individual, private ash tray that is compact so that it is completely portable and can be carried for example in a shirt pocket or a purse. The present invention provides such an ash tray which can be conveniently transported about and can be easily used by a smoker even in crowded environments. The smoker item can be conveniently retained inside the ash tray and, when the fan is in operation, the smoke from the item will be efficiently filtered and deodorized.

Other features of a more specific embodiment of the present invention includes a snuffer for extinguishing without crumpling a smoker item so that the item can be resmoked at a later time, a cutter for removing the ash portion of the smoker item, and an enclosed receptacle for retaining the tobacco ashes until the ashes can be properly disposed of.

In accordance with one embodiment of the present invention, there is provided a portable air purifying ash tray comprising a housing having an internal compartment for receiving ashes from a smoker item such as a cigarette or a cigar. A fan including an electrical motor is mounted to the housing for exhausting air from the internal compartment through a filter that is mounted to the housing. A control circuit selectively couples a portable electrical power supply to the motor for energizing the fan and exhausting the air through the filter.

These and other objects and advantages of the present invention will be discussed in, or apparent from, a consideration of the presently preferred embodiment set forth in the specification and claims hereinbelow.

BRIEF DESCRIPTION OF THE DRAWINGS

FIG. 3 is a top plan view, similar to FIG. 2, with the equipment compartment cover closed and the ash compartment cover open.

FIG. 4 is a rear elevational view of the ash tray depicted in FIG. 1 with both covers closed.

FIG. 5 is a front elevational view of the ash tray depicted in FIG. 1 with the ash compartment cover slightly open.

FIG. 6 is an enlarged perspective view of a cigaratte snuffer.

FIG. 7 is a side elevational view of the snuffer shown in FIG. 6.

FIG. 8 is an electrical schematic drawing of the electrical circuitry of the ash tray.

DETAILED DESCRIPTION OF THE PREFERRED EMBODIMENT

Figure 1:
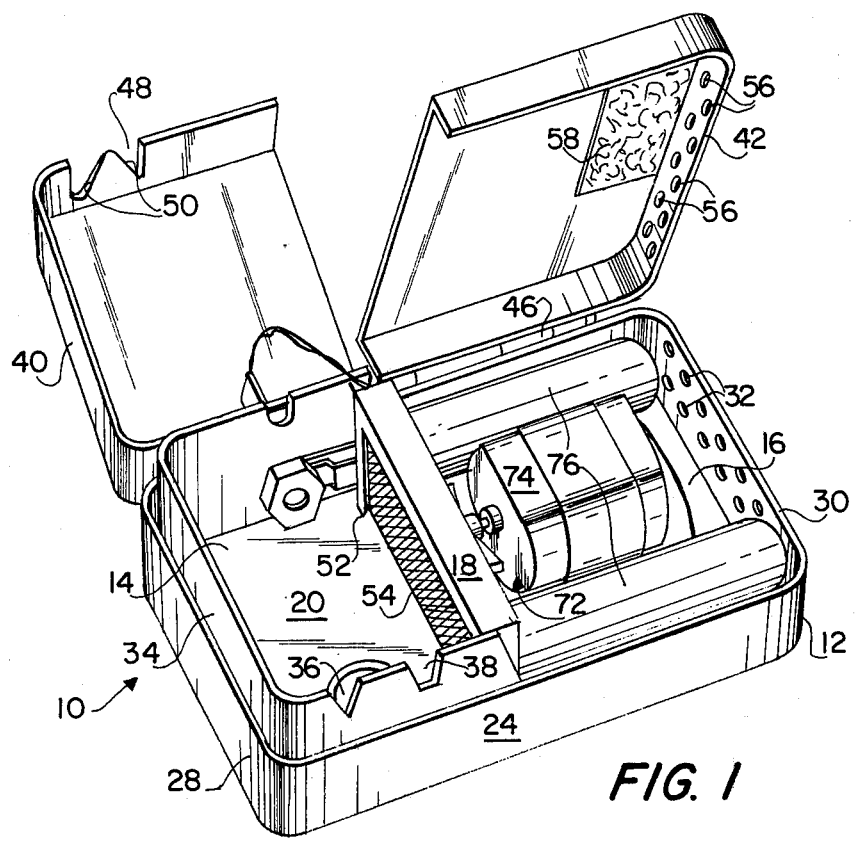
FIG. 1 is a perspective view of the presently preferred embodiment of a portable, pocket size ash tray.

Referring now to the drawings wherein like numerals depict like elements, there is shown a portable, pocket size ash tray in accordance with the present invention. Ash tray 10 comprises a generally rectangular, box-like housing 12 that has a first, internal ash compartment 14 and a second, internal equipment compartment 16. A divider 18 separates ash compartment 14 and equipment compartment 16. Housing 12 is comprised of a bottom 20 and upstanding therefrom and integral therewith a front 24, a back 26, and ends 28 and 30. End 30 has a plurality of orifices 32 completely therethrough, the purpose of which is set forth hereinbelow. A U-shaped insert 34 is rigidly mounted to the inside of housing 12 and defines three of the four sides of ash compartment 14. Insert 34 extends above the top edge of housing 12 and is sealingly connected at the open ends thereof to corresponding ends of divider 18. A V-shaped notch 36 and a generally U-shaped notch 38 are cut out of the top portion of the front side of insert 34.

Housing 12 is completely enclosed by a first, ash compartment cover 40 and a second, equipment compartment cover 42. Covers 40 and 42 are pivotally connected to housing 12 with hinges 44 and 46, respectively. When closed, covers 40 and 42 engage the top of divider 18 at their corresponding inner ends and completely seal ash tray 10. In addition, ash compartment cover 40 snugly engages the top portions of insert 34. An "M"-shaped notch 48 registers with V-shaped notch 36 in insert 34 for cutting a cigarette. Preferably, the mid portion of the M-shaped notch 48, which is V-shaped, has beveled, sharp edges 50 for providing a V-shaped knife.

Divider 18 comprises a frame section 52 and a filter section 54. Filter section 54 can be comprised of any number of filter types. Preferably, filter section 54 is comprised of a mechanical filter such as a fine wire mesh or glass fiber filter for removing particulate matter from the smoke and a surface area adsorbent filter made from, for example, activated carbon for removing odor causing gas and vapor.

Figure 2:
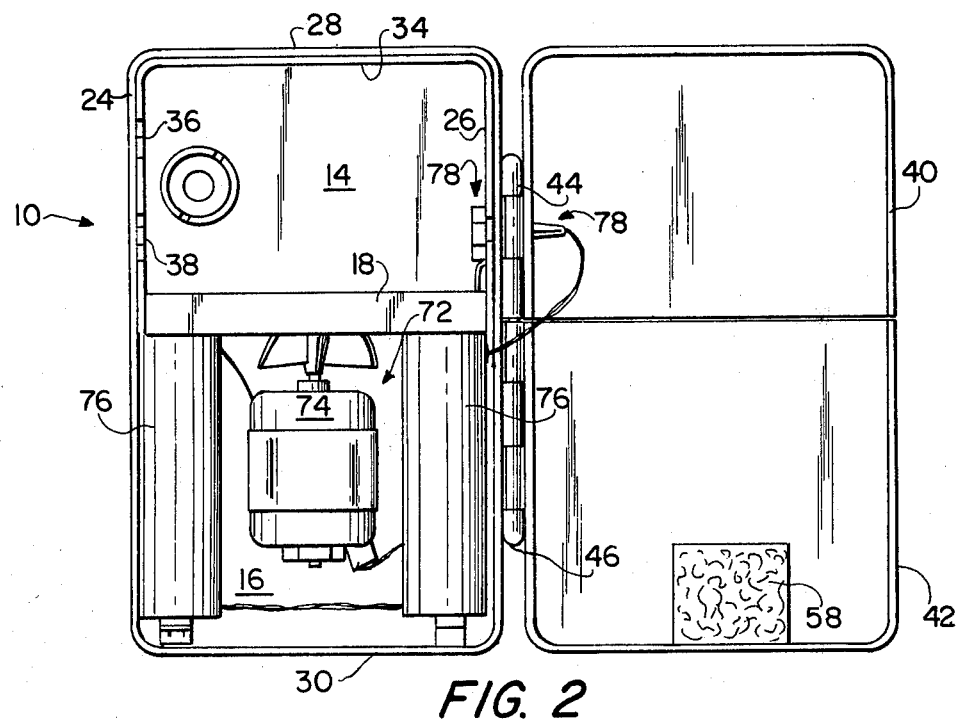
FIG. 2 is a top plan view of the ash tray shown in FIG. 1 with both covers completely open.

As best seen in FIGS. 1 and 2, equipment compartment cover 42 has a plurality of orifices 56 which extend completely through one end thereof. Orifices 56 serve the same function as orifices 32 in end 30 of housing 12, namely to permit the air being exhausted from ash compartment 14 through filter section 54 of divider 18 to be exhausted out of housing 12. In this regard, it is noted that when ash tray 10 is being used, equipment compartment cover 42 is normally in a closed, sealing position with housing 12, the inner end of equipment compartment cover 42 being in sealing engagement with the top of frame section 52 of divider 18. Equipment compartment cover 42 also has an absorbant pad 58 mounted thereon. Absorbant pad 58 can be comprised of any absorbant material such as cotton, a woven fabric, or a spongy material. The purpose of absorbant pad 58 is for holding a deodorant fluid, such as a perfume, so that the odor of any tobacco smoke getting through filter section 54 can be masked. If desired, any one of a number of commercially available chemicals which break down the odor causing components of tobacco smoke can be used instead of a deodorant. Naturally, a second absorbant pad can be used so that both a pleasant smelling deodorant and an odor destroying chemical can be simultaneously used. In this case, the absorbant pad holding the odor destroying chemical should be placed in close proximity to divider 18 and the absorbant pad holding the deodorizer should be placed as close as possible to orifices 32 and 56 in the end of ash tray 10 so that the odor destroying chemical will have minimal effect on the deodorant.

With reference to FIGS. 3, 6 and 7, there is shown a snuffer 60 mounted on bottom 20 of ash compartment 14. Snuffer 60 is used for extinguishing a partially smoked smoker item, such as a cigarette, without crumpling the cigarette so that it can be smoked again at a later time. Snuffer 60 comprises a cup-shaped receptacle 62 having an annular wall 64 that defines an inner cavity 66. Annular wall 64 is split at opposite ends to provide openings 68. Receptacle 62 has a diameter slightly larger than the standard diameter of a cigarette and has a depth of slightly less than the normal size of the ash on the cigarette to be extinguished. Approximately midway up wall 64 are two rectangular-shaped, directly opposed openings 70. Each opening 70 is located directly below and in communication with the split opening 68 in wall 64. As best seen in FIG. 7, rectangular opening 70 circumscribes approximately one-fourth of the circumference of annular wall 64 and extends substantially equidistance on each side of split opening 68.

Located in equipment compartment 16 is a fan 72 including a small, three volt DC electric motor 74 and a pair of size AA 1.5 volt storage batteries 76. Electric motor 74 is shock mounted in a conventional way to bottom 20 in the central portion of equipment compartment 16 such that fan 72 can take a suction through filter section 54 of divider 18 and hence draw the tobacco smoke out of ash compartment 14. By shock mounting fan 72, housing 12 does not act as a resonator and the noise level from fan 72 can be reduced to an easily accepted level. Batteries 76 are mounted in conventional mounting clips on either side of fan 72 and extend the length of equipment compartment 16.

With reference now to FIGS. 2, 4 and 8, a control circuit 78 is depicted. Control circuit 78 is for selectively coupling motor 74 to batteries 76 as a result of opening ash compartment cover 40. A first contact 80 is mounted on the back of ash compartment cover 40 and a second contact 82 is mounted therebelow to back 26 of housing 12. Thus, when ash compartment cover 40 is rotated about hinge 44 from a first, closed position to a second, completely open position, contact 80 mates with contact 82 to complete the electrical circuit, as shown in FIG. 8. Appropriate wiring, some of which is shown in FIGS. 1 and 2, completes the electrical circuit.

Alternately, control circuit 78 can simply consist of a manually operated switch.

Ash tray 10 can easily be operated. Ash tray 10 is normally carried about in, for example, a shirt pocket, with both covers 40 and 42 in their closed position and with removable batteries 76 located in their corresponding mountings. When a smoker desires to a light a smoker item, for example a cigarette or a cigar, the smoker simply opens ash compartment cover 40, thereby energizing electric motor 74 and starting fan 72. Absorbant pad 58 has previously been saturated with an appropriate deodorant or odor destroying chemical. When ashes are deposited in ash compartment 14, and of course when the smoker item is rested on U-shaped notch 38, fan 78 exhausts the fumes from ash compartment 14 through divider 18 and out orifices 32 and 56. Should the smoker decide that he wishes to save a partly consumed cigarette, for example, the smoker extinguishes the cigarette by inserting it into cavity 66 of the snuffer 60 and rolls the cigarette back and forth between the thumb and forefinger applying gentle downward pressure. As the cigarette is slowly lowered, the ashes are forced through opening 70. In this manner, the cigarette can be easily extinguished without it being crumpled and can be resmoked at a later time.

Housing 12 can be made from any one of a number of suitable materials. It is preferable, however, that the materials used be able to withstand the high temperatures of the smoker item. Thus a housing made entirely of metal or one made from an insulating material, such as a strong plastic material, that is lined with a metal foil would be perfectly acceptable. The particular embodiment of ash tray 10 depicted in the drawings is shown as being made from a high melting point, transparent plastic material.

Other embodiments of the invention are readily apparent. Thus, divider 18 can be removably mounted inside housing 12 so that it can be replaced when exhausted. In addition, equipment compartment 16 can be lined with an adsorbant material to better remove the undesirable odors from the tobacco smoke. Naturally, the arrangement of the elements in equipment compartment 16 can be varied. In any event, the present invention provides a readily portable and storable, relatively inexpensive, pocket size ash tray that includes a relatively silent, highly efficient tobacco smoke purifying means.

Although the invention has been described in detail with respect to an exemplary embodiment thereof, and some possible variations of the presently preferred embodiment have been described, it will be understood by those skilled in the art that still further variations and modifications may be effected within the scope and spirit of the invention.

I claim:

1. A portable, powered air purifying ash tray for use with smoker items comprising:
   an approximately pocket size, box-type housing having a first internal compartment including means for supporting a smokers item for receiving ashes from the smoker item, an enclosed second internal compartment having a covered top and bottom and means for placing said second compartment in fluid communication with the environment surrounding said ash tray, said second compartment located alongside said first internal compartment substantially in-line therewith, and a partition separating said first compartment and said second compartment and permitting fluid communication therebetween;

a first cover on said housing positionable between a first closed position covering said first compartment and a second, open position uncovering said first compartment;

a filter mounted to said partition such that substantially all of the fluid communication between said first compartment and said second compartment is through said filter;

a fan mounted in said second compartment for exhausting air from said first compartment through said filter into said second compartment and thence out of said compartment into the environment surrounding said ash tray through said means provided therefor;

a portable electrical power supply mounted in said second compartment being for energizing said motor; and a control circuit for selectively coupling said power supply to said motor for the energizing thereof.

2. An ash tray as claimed in claim 1 and further including a second cover for covering said second compartment and an exhaust port in said second compartment for conveying gases from the inside of said second compartment to the outside of said housing.

3. An ash tray as claimed in claim 1 wherein said control circuit is operated by said first cover upon the positioning thereof to said second, open position thereby energizing said motor and exhausting gases from said first compartment.

4. An ash tray as claimed in claim 1 and further including a deoderizing pad mounted inside said housing.

5. An ash tray as claimed in claim 1 and further including a snuffer mounted inside said first compartment for extinguishing smoking items, said snuffer comprising a cup-shaped receptacle having a cavity therein and having a split upper rim and at least one opening in the side wall.

6. An ash tray as claimed in claim 1 wherein said first compartment has a floor and walls which, together with said cover, completely enclose the space inside said first compartment and wherein one of said walls and said cover have mating openings at the edges for holding a smoking item and having a notch in the edge of one of said covers and one of said walls for cutting the smoker item when said cover is positioned to said first, closed position.

* * * * *